(12) United States Patent
Janse et al.

(10) Patent No.: US 7,215,434 B1
(45) Date of Patent: May 8, 2007

(54) AUTOMATED SCAN PROCESSING

(75) Inventors: Jan Jozias Janse, Henden-Panningen (NL); Johannes Franciscus Maria Elisabeth Geelen, Baarlo (NL); Antonius Cornelius Maria Van Buren, Velden (NL); Robertus Cornelis Willibrordus Theodorus Maria Van Den Tillaart, Gernert (NL)

(73) Assignee: Oce-Technologies B.V., Venlo (NL)

( * ) Notice: Subject to any disclaimer, the term of this patent is extended or adjusted under 35 U.S.C. 154(b) by 1016 days.

(21) Appl. No.: 09/680,427

(22) Filed: Oct. 6, 2000

Related U.S. Application Data

(60) Provisional application No. 60/162,226, filed on Oct. 29, 1999.

(51) Int. Cl.
   *H04N 1/60* (2006.01)
   *H04N 1/00* (2006.01)
   *G06F 15/00* (2006.01)

(52) U.S. Cl. ............. 358/1.15; 358/1.9; 358/1.18; 358/403

(58) Field of Classification Search ............ 358/1.15, 358/1.9, 1.18, 403, 408, 434, 471, 474
See application file for complete search history.

(56) References Cited

U.S. PATENT DOCUMENTS

| | | | |
|---|---|---|---|
| 5,718,520 A | | 2/1998 | MacKay |
| 5,764,866 A | * | 6/1998 | Maniwa ............. 358/1.15 |
| 5,768,483 A | * | 6/1998 | Maniwa et al. ......... 358/1.15 |
| 5,911,044 A | * | 6/1999 | Lo et al. ............. 709/203 |
| 6,237,011 B1 | * | 5/2001 | Ferguson et al. ........ 715/515 |
| 6,708,309 B1 | * | 3/2004 | Blumberg ............. 715/530 |

FOREIGN PATENT DOCUMENTS

| | | |
|---|---|---|
| EP | 0 596 724 A1 | 5/1994 |
| EP | 0 651 296 A2 | 5/1995 |
| EP | 0756414 A2 | 1/1997 |
| EP | 0757311 A1 | 2/1997 |
| EP | 0 817 462 A2 | 1/1998 |

* cited by examiner

*Primary Examiner*—Twyler Lamb
*Assistant Examiner*—Houshang Safaipour
(74) *Attorney, Agent, or Firm*—Birch, Stewart, Kolasch & Birch, LLP

(57) ABSTRACT

A method, apparatus, article of manufacture and data structure for automating the processing of scan data files generated by a digital scanner are presented, in which an operator selects at the scanner console one of a set of preprogrammed scan job types and starts it. Then, a scan data file is automatically synthesized from the scan data generated in the scanning process and meta data that identify the selected scan job type. The synthesized scan data file is transmitted to a server that recognizes the meta data and processes the file further in accordance with the scan job type identified in the meta data. Scan job types can be created by users and downloaded to the scanner and the server.

35 Claims, 8 Drawing Sheets

AUTOMATED SCAN PROCESSING

This application claims priority on provisional Application No. 60/162,226 filed on Oct. 29, 1999, the entire contents of which are hereby incorporated by reference.

FIELD OF THE INVENTION

The invention relates to a method for automating the processing of scan data files generated by a networked digital image scanner and a related method of use in such a scanner.

BACKGROUND OF THE INVENTION

With the advent of digital technology, more and more documents are generated in digital form, which facilitates easy methods of handling, processing, archiving, etc., even for huge numbers of documents. However, there are still many documents available in physical form (also known as hard copy) only, and these can only be processed in digital systems after they have been converted into digital form (also known as soft copy) by scanning in a digital scanner. Such a digital scanner may be connected to a network, so that it has access to a workstation or a bulk storage device for storing the scan data file there.

In recent times, bulk scanning services have developed, that offer scanning and archiving of large collections of documents, such as complete "paper" archives. In such services, it is important that the actual scanning procedure is fast and simple, such that large numbers of different documents can be processed in a short time.

Several methods of automating the storage or further processing of scan data files have already been proposed.

For instance, published European Patent Application, Publication No. EP-A 0 757 311, discloses a scanner that has means for connecting to a computer network to which a plurality of computers are connected. The scanner has access to the file structure of the computers and the operator of the scanner can in this way select a specific directory for the storage of a scan file. When a large number of documents must be scanned and stored in different directories, logging in to many different directories or computers slows down the scanning process.

Published European Patent Application, Publication No. EP-A 0 756 414, discloses a network system including a scanner and a file server. The file server manages a file structure of dedicated directories, including personal directories of office workers and directories connected to a specific service, such as for copying or facsimile transmission. In use, an operator keys in a code number assigned to one of the directories, and starts the scan process. The scanner then connects to the specific directory in the server, performs the scan and stores the scan data in that directory. In the case of a functionally-connected directory, the scan data are then automatically routed to the connected service. Also, personally preferred scan process settings can be stored in advance in the personal directory of an operator. Upon scanning, the settings are read and imported from the relevant personal directory.

A disadvantage of this system is that a network connection must be made to the file server before a scan session can be started, because routing to any further handling in the server is essentially performed in the scanner. In other words, the infrastructure of the data generation (the scanner) and that of the data processing (the file server) are interwoven, which may give rise to unexpected interactions and prevents a clear separation of responsibilities.

SUMMARY OF THE INVENTION

The invention, in part, provides a method of operating a networked scanning system in which many different documents can be scanned and further processed in different ways fast and easily and that can be operated by operators without technical knowledge.

Such a method comprises:
  selecting, at the scanner, a specific scan job type from a list of pre-defined scan job types, each scan job type having pre-specified properties;
  scanning one or more documents according to properties of said specific scan job type, thereby generating a file of scan data;
  automatically synthesizing a scan data file including scan data generated during the scanning step and meta data relating to properties of said specific scan job type;
  transmitting the scan data file synthesized in the synthesizing step to an image server;
  automatically analysing, upon reception of a transmitted scan data file in the image server, the scan data file as to the data contained therein; and
  automatically further processing the scan data file in a way specified by said meta data contained therein.

The automatically synthesized meta data include a code that controls the image server, which is programmed to interpret the meta data and act according to the code contained in the meta data. Scan job types having dedicated meta data including a code that specifies a way of further processing can be pre-defined and downloaded into the scanner and into the image server. According to an aspect of the invention, several different scan job types, each including dedicated meta data that defines a further processing prescription, are available for selection by an operator of the scanner. In this way, the operator may easily process one document in a first fashion and a second document in another fashion without having to bother about reprogramming the system, but just by selecting another scan job type.

The invention also, in part, relates to a scanner apparatus and/or server in which aspects of the method according to the invention are implemented and to digital data embodiments (a data structure and/or software) for use with the method according to the invention.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF THE PREFERRED EMBODIMENTS OF THE INVENTION

Figure 1:
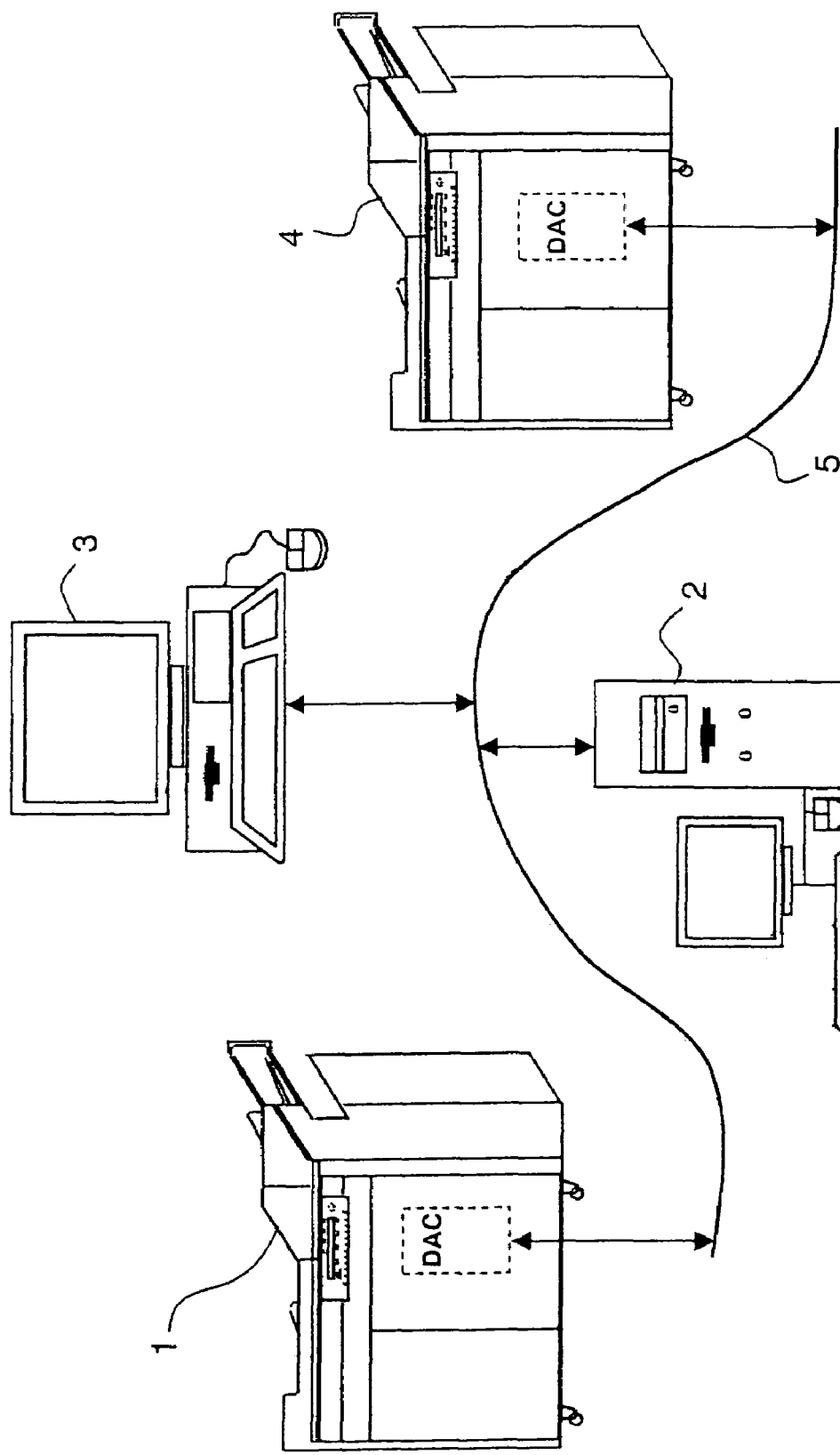
FIG. 1 shows a schematic view of the basic elements of a system embodiment according to the invention.

FIG. 1 shows a schematic view of the basic elements of a system embodiment in which the method according to the present invention is implemented. A scanner 1, an image server 2, a workstation 3 and a printer 4 are all interconnected through a digital network 5. For simplicity, only one scanner, printer and workstation are shown, but in most practical systems there are several or even many of these elements. The scanner and printer may have the form of a suitably programmed digital copier, such as the Océ® brand of digital copier, model no. 3165, manufactured by Océ Technologies, B.V. In that case, both the scanner function and the printer function may be performed by one-and-the-same digital copier. The scanner 1 and the printer 4 are provided with a digital access controller (DAC) that controls the network-related activities of these machines. The server 2 may be a PC programmed, e.g., as a WINDOWS NT server provided with sufficient storage capacity for storing scan data files. The workstation may be a PC used by an office worker. One of the workstations is used by a system administrator.

With this system, physical documents can be productively scanned and translated into digital documents in the scanner 1, transferred via the network 5 to the image server 2 for further processing, such as printing in the printer 4. A user may be kept informed of the process by a monitor function in his workstation 3. Also, the system administrator can control the processes in the system.

Before a scan process can be started, control information must be set for the process, such as specifications of the data format for the scan data generated, specifications of the properties of the document to be scanned and of the properties of the target document that would be produced when printing the scan data. These data can be inputted by the operator through the operating panel and the user interface of the scanner. However, some of the data can be automatically determined, such as the size of the document to be scanned, and other data may be preprogrammed as a default. In order to provide several possible output formats, the scanner according to the present invention is preprogrammed with a set of different options which can be selected by an operator through the user interface of the scanner.

Figure 2:
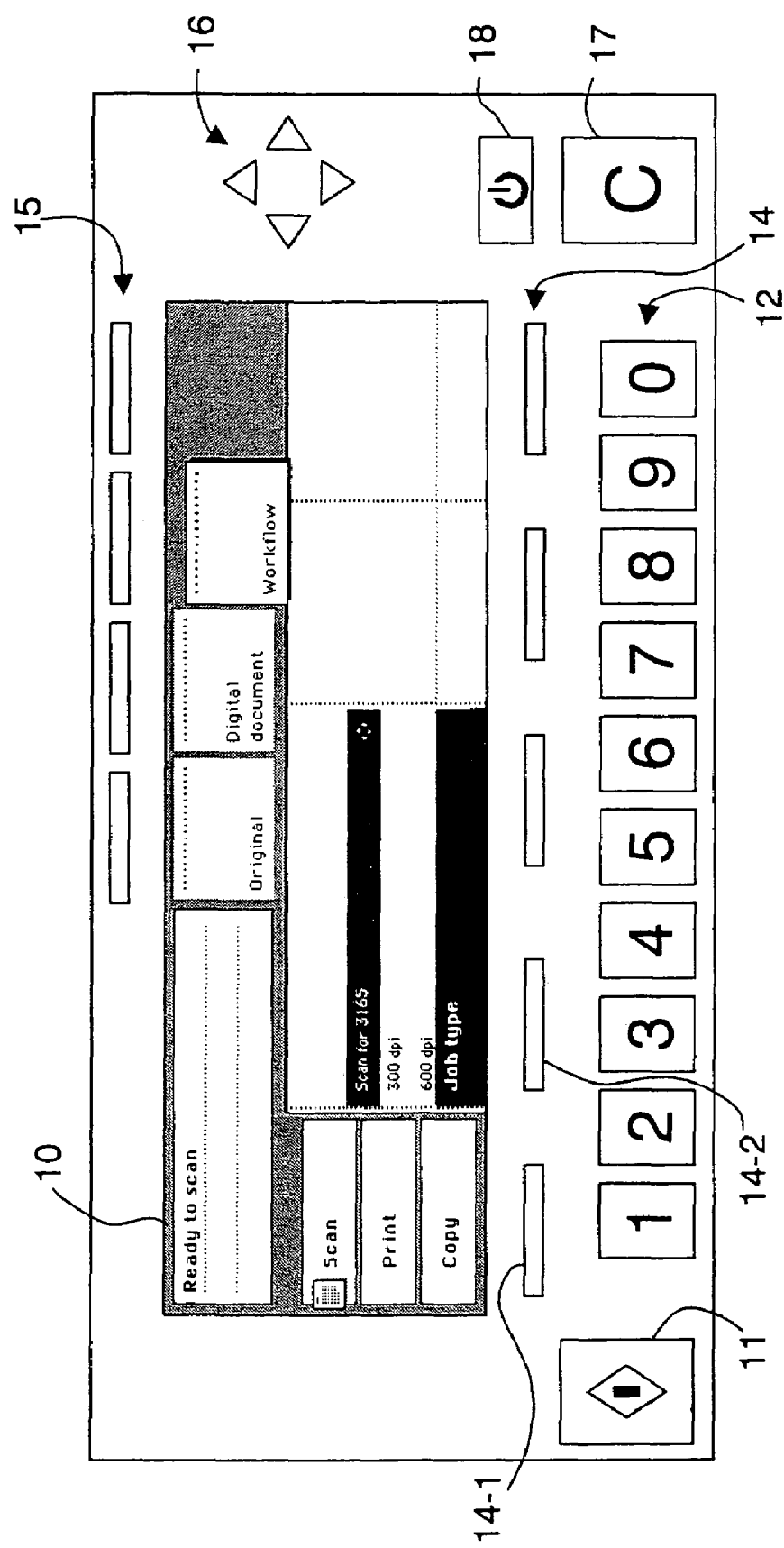
FIG. 2 shows the operating panel of a scanner embodiment according to the invention.

An operating panel of a scanner embodiment according to the present invention is shown in FIG. 2. It includes a display screen 10, such as an LCD, and a number of keys, namely a START key 11, number keys 12, soft keys 14, index keys 15 (which are also examples of soft keys), a star key cluster 16, a CANCEL key 17 and a STOP key 18. The number of soft keys 14 and index keys 15 will depend upon the particular situation to which the present invention is applied.

In operation, the display screen 10 displays an image formed by a number of columns each situated above one of the soft keys 14. Each column relates to a specific basic function of the machine and shows the different possible settings of that basic function. The soft key 14-1 selects the particular basic function referred to as the operating function, i.e., the function of enabling the selection between the operating functions, namely the copying function, the printing function and the scanning function of the machine. The setting selected, in this case the scanning function, is denoted by a marker, in this example an icon depicting a document image, or otherwise, for instance reverse video. In addition, the setting selected for the leftmost column determines the contents of the other columns, because each operating function has its own relevant basic functions.

By operating one of the soft keys 14, the operator can select the relevant basic function and may select one of the possible different settings thereof, either by repeatedly pressing the key, in which case the list of settings is stepped through cyclically, or by operating the star keys 16.

The index keys 15 offer the option of calling up a different set of basic functions. The selected index key is shown as being displaced. Thus, in FIG. 2, the work flow function is selected. The sets of functions tied to the index keys 15 are dependent on the selected operating function, while the other basic functions selectable with the soft keys 14 are in turn dependent on the selected index key.

In the example of FIG. 2, the scanning type of operating function has been selected, and the active index keys refer to: "original"—the properties (size, reading direction, etc.) of the document to be scanned; "digital document"—the properties of the scanning process itself (enlargement, image quality, etc.) as well as those of the output document description (size, reading direction, etc.); and "workflow"—a set of preprogrammed job descriptions, to be called "scan job types" hereinafter, which primarily define the digital aspects of the scan data file, which will later be explained in detail.

In the example of FIG. 2, the index key "workflow" has been selected, and in reaction a broadened column has been opened above the soft key $14_2$, showing a pick list of scan job types, of which the uppermost one, "Scan for 3165", has been set.

The concept of "scan job types" (SJT) will now be explained.

A scan job type defines a named combination of scan output settings and is used as a shortcut to quickly load the scan output settings for a specific type of scan job. A scan job type is defined by a unique name and is composed of:

1) a scan job description,
   providing a name to be shown on the scanner display in the pick list, e.g. "memo", "scan for 3165", "fax", etc., 2) an output file format,
   specifying a format and a compression algorithm; possible values are, e.g., "TIFF CCITT.T4 (fax group 3, 1D)" or "TIFF CCITT.T6 (fax group 4, 2D)", 3) an image processing characteristic,
   specifying parameters for the on-board image processing functions in order to optimize the scan data for an application program intended to further process the data; possible values are, e.g., "600 dpi, optimized for printing on an Océ 3165 printer", "300 dpi optimized for viewing and archiving", etc., 4) an application selector, providing data used to select the above-mentioned intended application program; it defines a string of characters for incorporation into the file name, e.g., a dot-suffix such as .pdf., which may be used by the image server upon reception of the scan data file to decide what should be done with the file, including, e.g., storage in a predetermined data base, automatic transmission as a fax, etc., 5) identification number requirements, defining a minimum and maximum number of digits for an identification number of the scan job, which will be incorporated into the file name of the scan data file, 6) name/number dialogue title, providing text to be presented on the scanner display, requiring the operator to input an identification number for the scan data file, e.g. "enter document number", etc., and 7) confirm file name selector, providing a boolean defining whether to confirm the file name on the display before scanning actually starts.

The application selector <4>, the identification number requirements <5>, the name/number dialogue title <6> and the confirm file name selector <7> may be left blank or filled with zeroes, in which case the related functionality is switched off.

Figure 3:
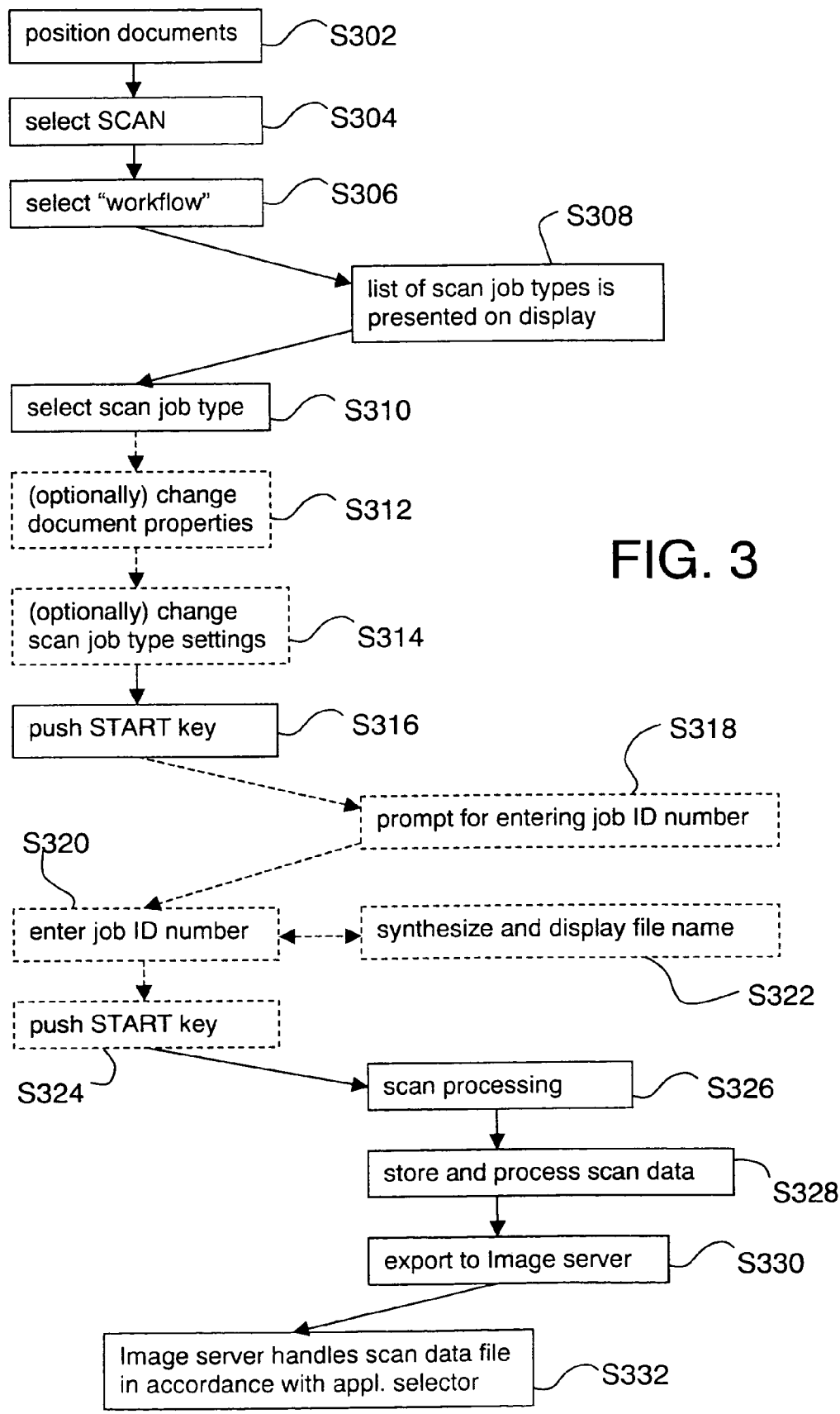
FIG. 3 is a flow diagram of a scanning procedure according to the invention.
Figure 4:
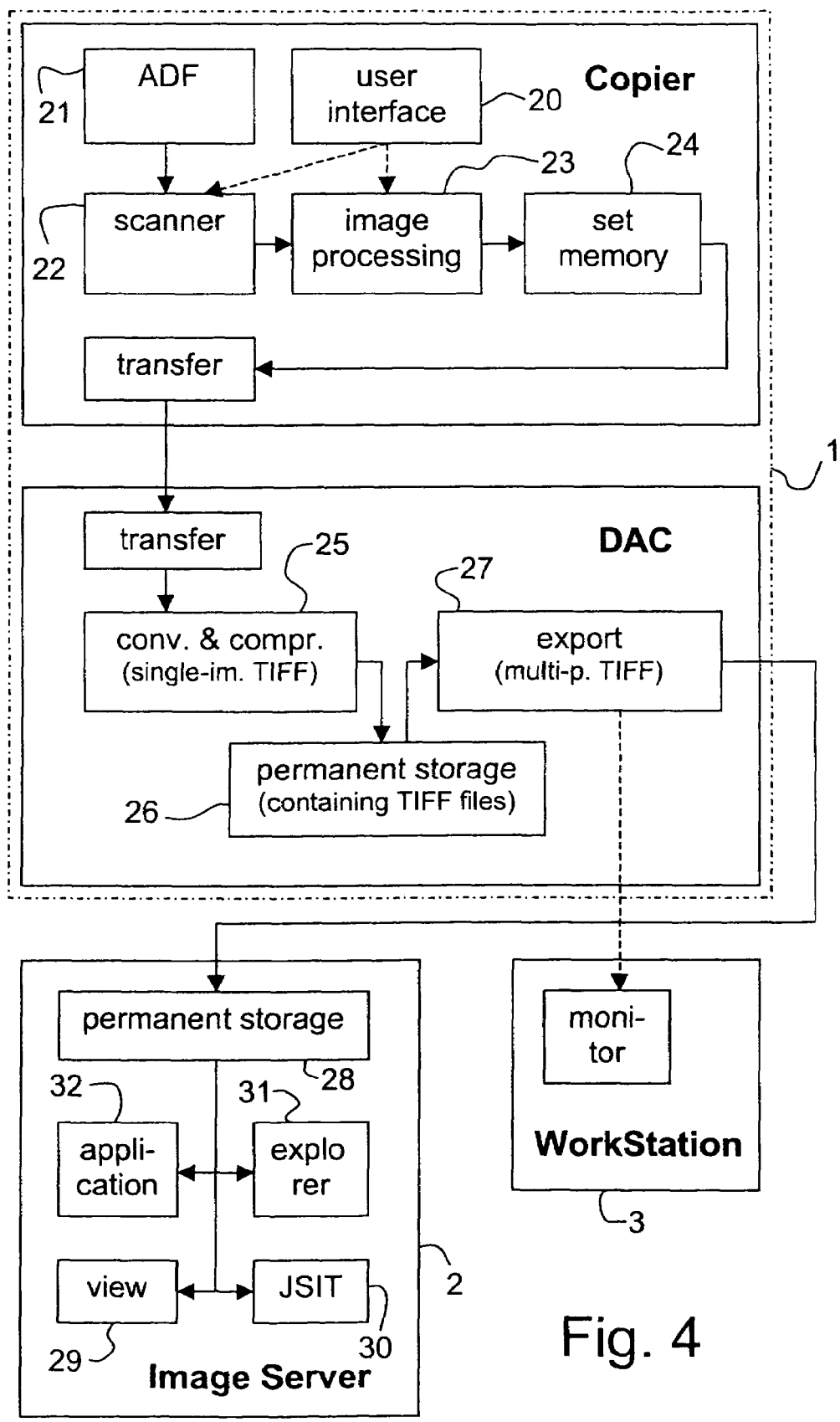
FIG. 4 is a block diagram of the system of FIG. 1.

The scanning procedure in the system of FIG. 1 will now be explained with reference to a flow diagram shown in FIG. 3 and a block diagram shown in FIG. 4. It is assumed that the scanning is performed on a digital copier, and the term "scanner" will from now on be used for the scanner engine forming part of the copier.

First, at step S302 the operator places the documents to be scanned in the input tray of the automatic document feeder (ADF) 21 of the scanner 22 or directly on the glass platen of the scanner 22, and, at step S304, selects the "scan" function on the operating panel. Then, at step S306, he pushes the "workflow" index key 15.

In reaction, at step S308, the DAC fetches the available scan job types from its memory and shows them in a pick list on the operating panel 20 of the copier for the operator to select one of them. At step S310, the operator may then select a scan job type, using the keys 16, and confirm his choice by pushing the START key 11. Alternatively, if the document to be scanned is different from the type that is default programmed for the scanner, at optional step S312, the operator may push the "original" index key 15 and change the settings shown on the display in reaction. Also, at optional step S314, the operator may change the default scan process settings prescribed by the scan job type by pushing the "digital document" index key 15 and correcting the relevant settings shown.

Figure 5:
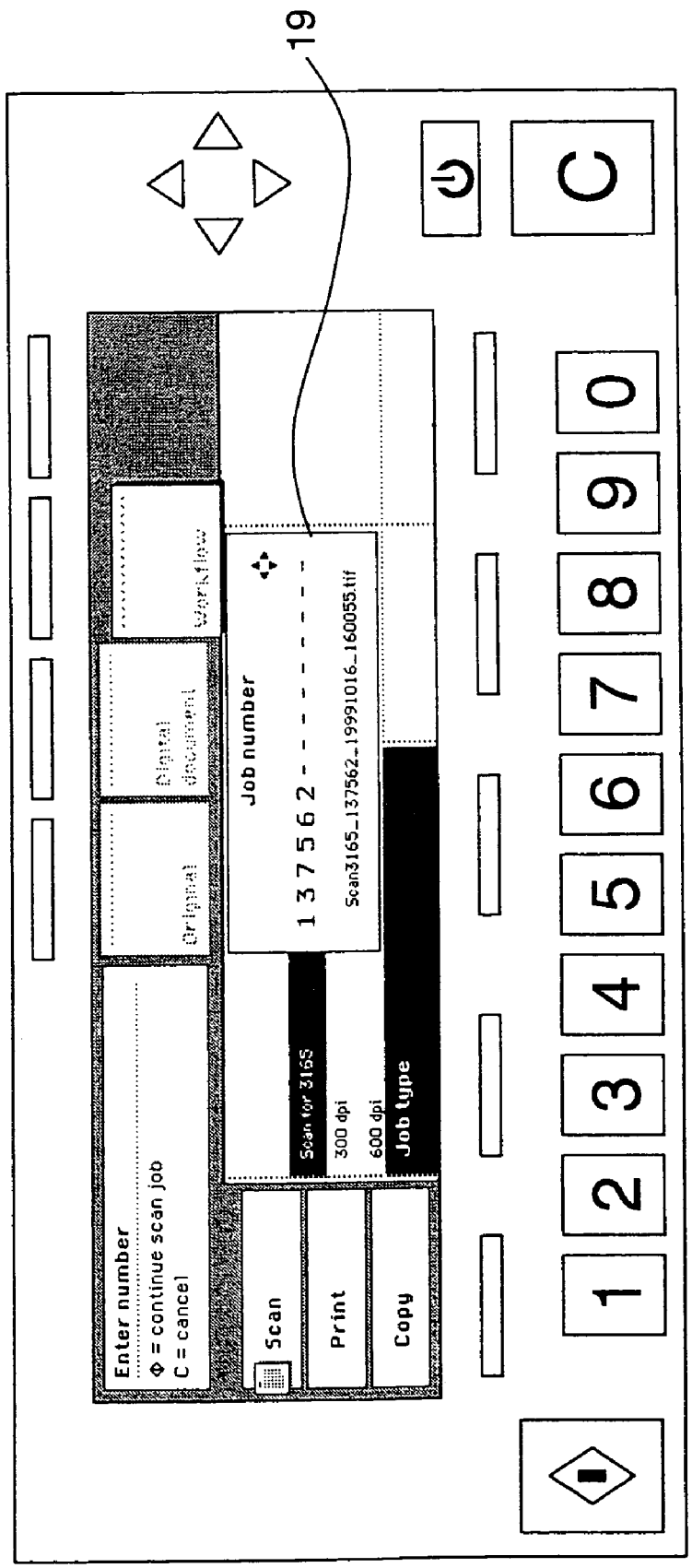
FIG. 5 shows the operating panel of FIG. 2 in a specific state.

Then, at step 316, the operator pushes the START key 11. If the number dialogue in the scan job type is active, at optional step S318, the DAC now displays a forced dialogue including the name/number dialogue title defined in the scan job type description, requiring the operator to enter an identification number for the job at optional step S320. This is shown in FIG. 5. Also, if display of the file name is defined as "on", the complete file name, including the job number (being) input by the operator, is synthesized (from the application selector string, the identification number inputted by the operator and the date and time of the scan and then shown in the dialogue window at optional step S322.)

It is noted that steps S312 and S314 are optional in the sense of being dependent upon an operator's desire to make a change. In contrast, optional steps S318, S320, S322, and S324 are optional in the sense that they arise in dependence upon whether the job type is active, which it might not always be.

After having input the job number, at optional step S324, the operator again pushes the START key 11. The copier now starts the scanning process at step S326. At step S328, the scan data generated are processed in the image processing section 23, which has been programmed according to the specifications of the selected scan job type, and are then temporarily stored in the internal set-memory 24 of the copier. Directly after storing, at step S330, the following occurs. The image data are transported to the DAC, where they are converted to a compressed TIFF-file (25) that is stored on the hard disk 26 of the DAC. Meta data defining the specific scan job type (the 7 items listed above) is automatically included in each file. When the scan data of all documents of the scan job have been stored on the disk, they are consolidated into one multi-page TIFF-file and a file name is generated, which includes the specific scan job type definition meta data. The multi-page TIFF-file is then exported (27) to the image server 2 over the network 5, using a generic ftp-protocol.

When the scan data file arrives at the image server 2, the latter stores the file in its disk memory 28, reads out the meta data and handles the file in a way specified in the application selector string in the meta data as in step S332. Therefore, the image server 2 has a list of all application selector strings available in the system, together with data regarding how to handle the files for each one of them. Since the application selector string may be empty, the image server is programmed with a default handling instruction as well.

Examples of handling instructions are:

viewing on a TIFF view application 29, printing, using an automatic job submission application (JSIT, 30) which transforms the scan data file into a printable Postscript file and submits it to a printer without using a printer driver, storing in a directory structure specified by the scan job type or defined by the operator in forced dialog using the name/number dialogue function (if such is defined in the scanjob type description); an application 31, such as MS windows explorer, could be used for this function, conversion into a fax file and transmission; the name/number dialogue can again be used for inputting the fax number of the addressee at the time of scanning, conversion into an e-mail file and transmission; the name/number dialogue can again be used for inputting the e-mail address of the addressee at the time of scanning, routing to a user's workstation 3; an identification of the specific user may be programmed in the application selector of one of the scan job types, or may be entered therein using the mechanism of the name/number dialogue; the image server 2 may be provided with a database including the network addresses of the users, needed for transmitting the scan data file to the user's workstations, and routing to another application 32, such as set-editing applications (to change the order of images, single/double sided conversion, combine files), store/retrieve applications (to couple to customer numbers, OCR), image enhancement applications (to remove holes, speckles and/or shadows, replace fonts, book-split), electronic forms applications (to use image to fill in preprogrammed forms), etc.

An advantage of this construction is that, if the server happens to be down or for other reasons cannot accept data files, the scan data files can wait on the DAC disk, while scanning can proceed without interruption.

The workflow described above can be monitored by a user at his workstation, using a monitor program that is logically connected to the DAC of the scanner and receives status information of the latter. In this application program, a scan-monitor window can be opened, in which the number of scan data files waiting for export is visible. Every time a file is ready for export, the number is counted up and when it has been completely exported, the number is counted down. If an ftp-error occurs, this is also shown in the scan-monitor window. This monitor program can be switched to a mode in which status changes are reported to a user by showing alert messages on the display screen of his workstation, e.g. when all scan files have been exported, when an export cannot start or when an export cannot be completed.

Figure 6:
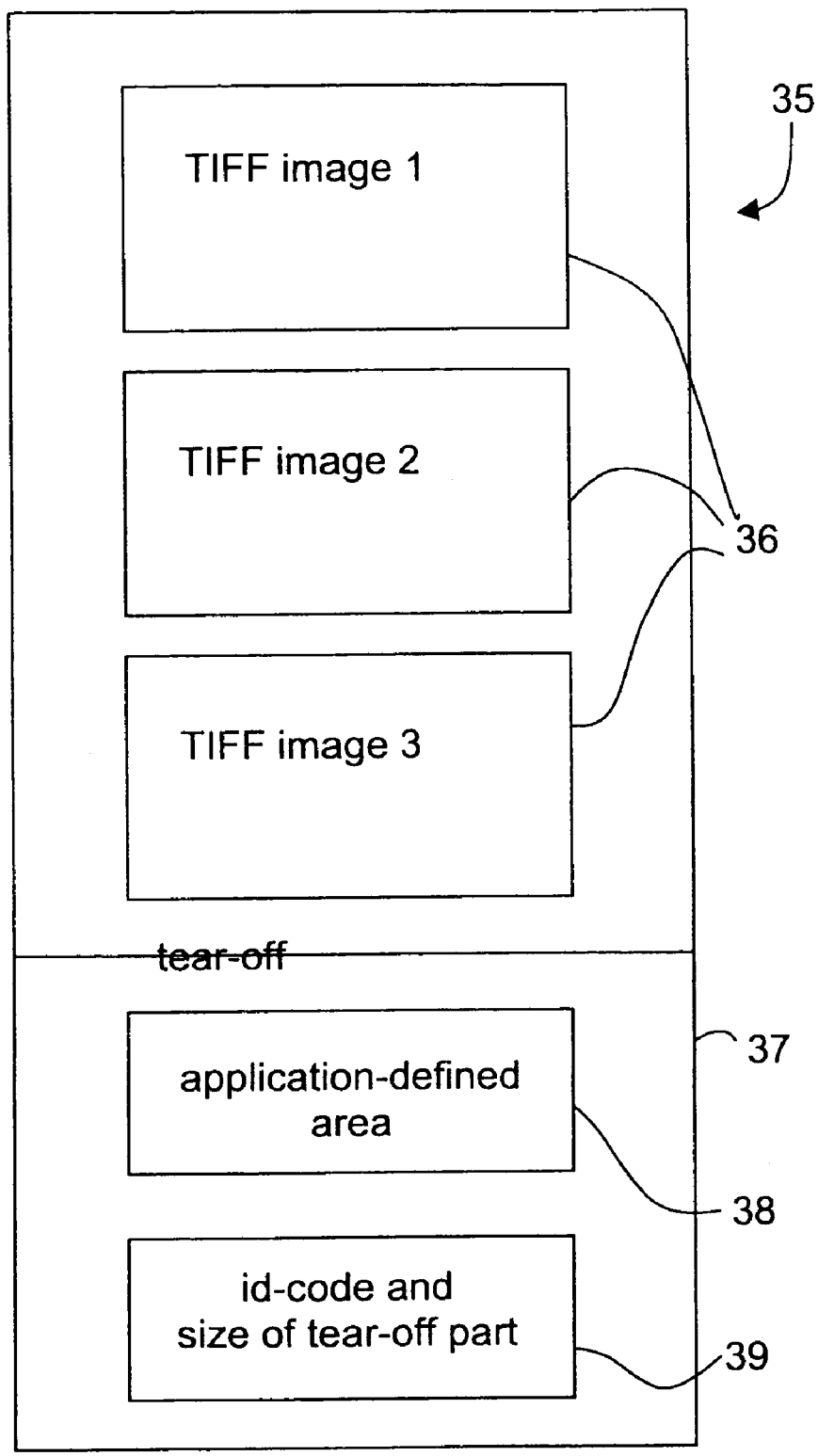
FIG. 6 is a schematic representation of a multi-page scan file according to the invention.

FIG. 6 shows schematically the form of a multipage TIFF file 35. It comprises one or more scanned images 36. Various TIFF-tags (as defined in the TIFF standard) are attached to each image. The TIFF-tags contain information describing the image, as well as the meta data defining the scan job (type), which is thus replicated for each image. Further, the TIFF file comprises a tear-off part 37 having an application defined area 38 in which applications may attach specific information, such as a print job ticket defining print settings for the case that the file is printed. Previously written data should not be overwritten or deleted by another application. Also, the tear-off part contains an end section 39 including an identification code that identifies the kind of file and is used as a tamper-check, and the size of the tear-off part. The end section has a fixed length of, e.g., 7 bytes, so that it can easily be found.

Scan data files stored in the image server 2 can also be selected and printed on demand, using the Jobsubmittor (JSIT) user interface of the server. This will now be explained.

The JSIT can display a list of files pending for printing on the display screen of the server 2. These files can be identified by various job-attributes that are specified in TIFF-tags appended to the image file, e.g. number of pages, resolution, compression. All static and job-specific TIFF-tags can be chosen to be displayed in the print-document description in the displayed list. A selection of print settings can be chosen to be displayed as well. Another aspect that can be displayed is whether a file is in a condition for printing, optimized for the connected printer, or has been tampered with by a processing application.

The tamper-check code in the end section 39 of the multi-page TIFF file, mentioned above, is used for checking if the file has been changed during its processing in the image server 2. The code is normally not recognized by third-party applications, so that it is lost during processing. If the file is later returned to the system for printing, it may have lost its optimisation for the printer(s) of the system. By simply checking if the code is still present, it can be determined if the file can still be printed with high quality. If the file has the proper format for printing, but the code is not present, the operator will be warned that print quality is no longer guaranteed.

After identification, one or more print jobs may be selected for printing, if required after changing the print settings, and then submitted. The TIFF print file is then translated into Postscript by the JSIT, by wrapping the (still compressed) images in a Postscript jacket, and the file is submitted to the printer.

In a first embodiment of the present invention, there is only one list of scan job types for general use. Scan job types are installed in the system by the system administrator from his workstation. The procedure for installing a new scan job type in the scanner 1 is simple and standardized, so that it does not require high programming skill. It will now be explained with reference to FIG. 7.

A scan job type definition is a file with a fixed format, listing values for the 7 data items described above. Referring to the numbering given above for the separate items of the scan job type file, the file has the general form of:

<1>,<2>,<3>,<4>,<5a>,<5b>,<6>,<7>

(in which <5a> and <5b> define the minimum number and maximum number of digits).

Examples of a scan job type file are: "internal reports, G3-1D, 600 dpi-optimized-for-printing-on-Océ3165, intrep, 6, 6, enter internal report number, n", and "general archive, G4-2D, 300 dpi-optimized-for-viewing-and-archiving, doc, 4, 12, document number, y".

In these examples, the application selector "intrep" controls the image server 2 to convert the scan data into a pdf-file and to store the file in a specific directory for internal reports under the standardized report number, where it can later be fetched for viewing or printing on demand, Also, the application selector "doc" specifies storing the file in an archival data base under a document number of between 4 and 12 digits.

In order to install a new scan job type, the system administrator logs in to the DAC via ftp and downloads a new scan job type file into a directory "newsjt" of the DAC. The DAC picks up the file, parses it, and if it is correct adopts it for use by the user interface of the scanner. A successful adoption is reported in a "last download result" file 40 with a message "scan job types updated at <date, time> on the DAC; number of scan job types=< . . . >", that can be checked by the system administrator-workstation. Also, a list of available scan job types can be read from an "active-sjt" file 41 of the DAC, which can be read-out by the system administrator-workstation.

In addition, the image server 2 is also programmed with the new scan job type and with the procedures for further processing the files as defined in the new scan job type. The actual programming in this case is, of course, application-specific.

In a second embodiment of the present invention, users each have their own personal scan job types, or a personal selection or subset from a larger set of scan job types for general use, or both, and a mechanism is provided for presenting only the relevant scan job types to a user for selection. When many users are connected to the scanner, the list of the personal scan job types of all users may be too long for easy use. Therefore, a process is now explained, in which only the personal scan jobs of users who at any moment actually want to make a scan are presented for selection, possibly in addition to a number of scan job types for general use.

In order to achieve this, an additional service, hereinafter referred to as "dynamic scan job type service" (DSS) is implemented in the system, e.g. in the DAC or in one or more of the workstations. This service manages a database having entries for all users, specifying the personal scan job types of the users. The working of the service is now explained with reference to FIG. 8 and FIG. 9.

Figure 8:
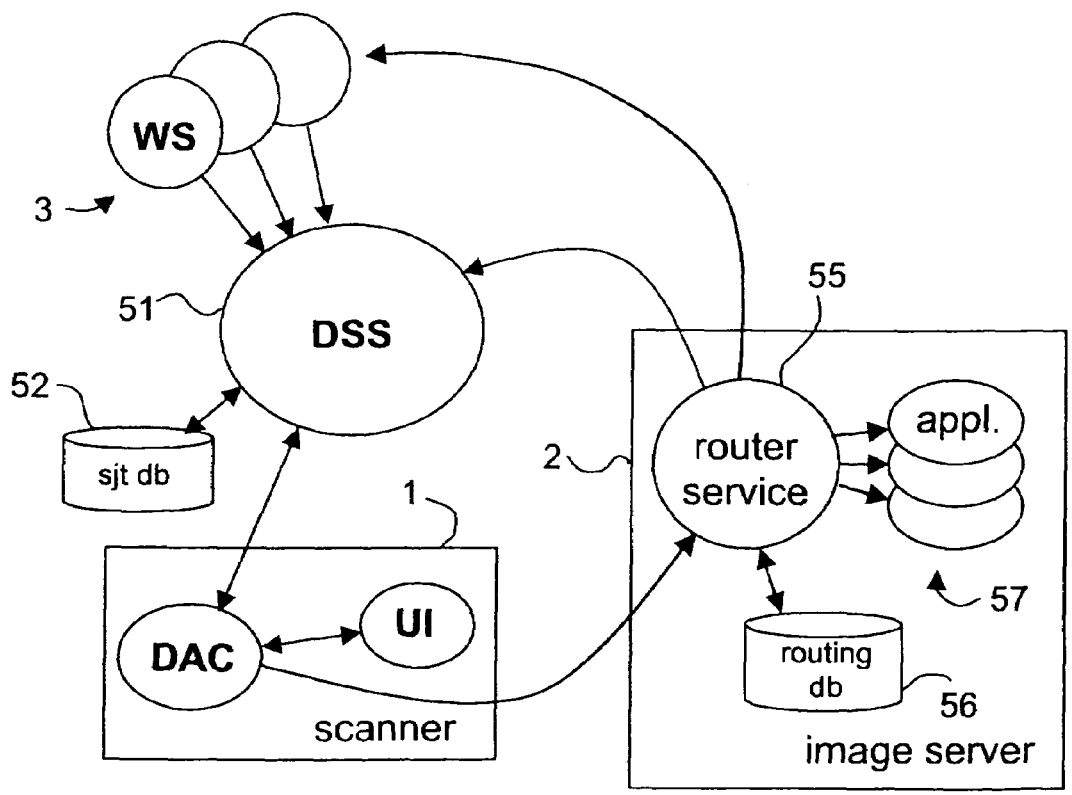
FIG. 8 is a schematic view of elements of a second embodiment of the invention.

FIG. 8 shows a schematic overview of the system part related to the DSS function. The DSS 51 is connected to the DAC of the scanner 1 and a router service in the image server 2 and also, but not necessarily to workstations 3 of users. Also, the DSS 51 has access to a database 52 containing scan job type descriptions of the users.

The DAC of the scanner is connected to the user interface UI of the scanner for communication with an operator and to the router service 55 in the image server 2 for downloading scan data files. The router service 55 in the image server 2 is further connected to application programs 57 dedicated to specific processings of scan data files and to the work stations 3 of the users for downloading scan data files thereto. Further, it has access to a routing database 56.

Figure 9:
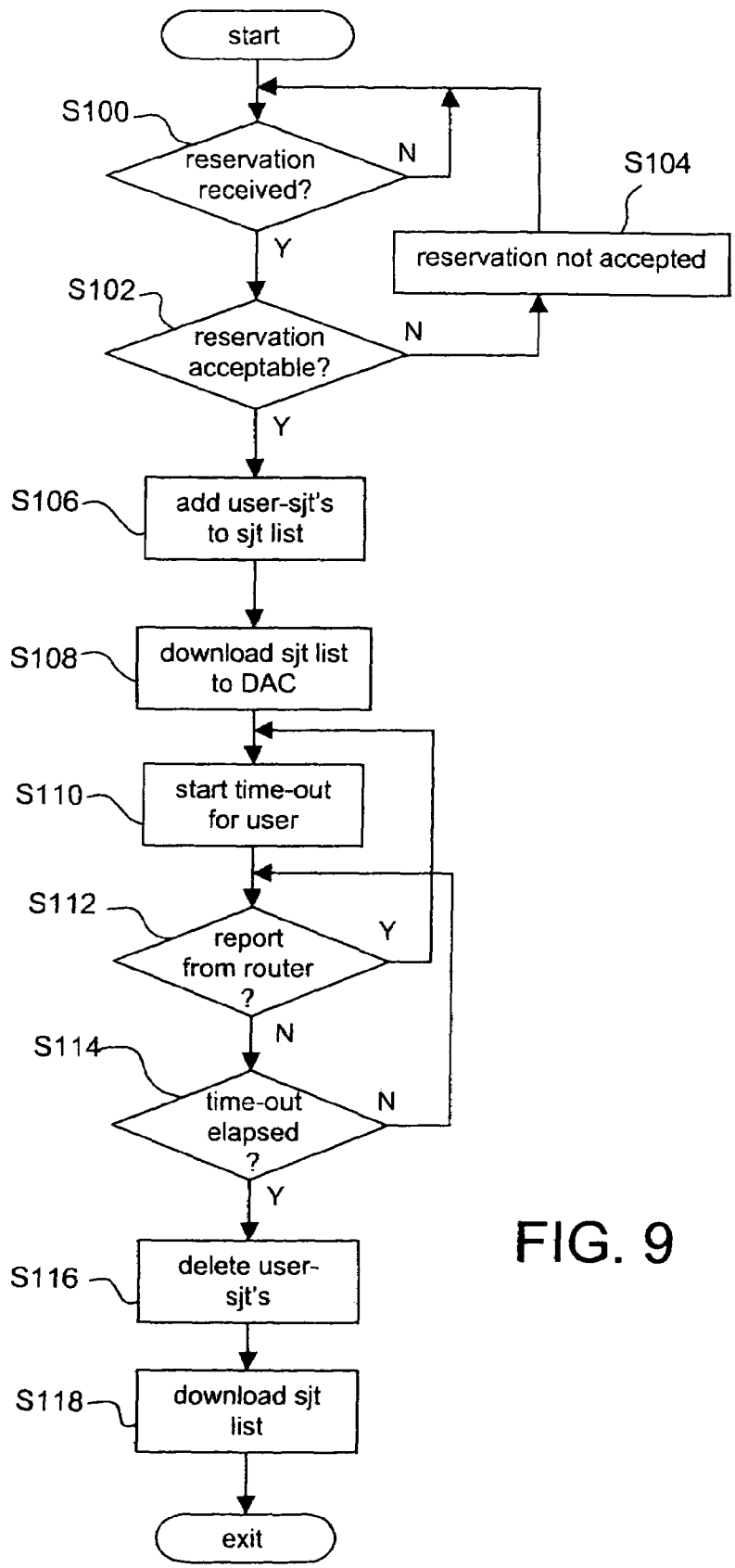
FIG. 9 is a flow chart relating to the second embodiment.

The process residing in the DSS is now further explained with reference to FIG. 9.

A user, wishing to make a scan using a scan job type, enters a reservation, including his identification (id) on the operating panel of the user interface UI in the scanner 1. In reaction, the UI sends the user id to the DAC, which transmits it to the DSS 51, where it is received in step S100. Alternatively, a user may also make his reservation at his workstation 3, which then transmits the reservation, including the user id, to the DSS 51.

The DSS checks a new reservation for acceptability in step S102. If too many users make reservations, the selection list on the user interface display of the scanner 1 would become too long and insurveyable for the operators. Therefore, the number of active users may be limited to a maximum and new reservations may be refused until others are checked out. Alternatively, the DSS may be programmed to take other measures when too many reservations arrive, for instance by shortening the time-out period (to be described below with reference to step S110) during which the DSS waits for users to report at the scanner, or by only accepting reservations made at the UI operating panel of the scanner. If the DSS refuses a reservation (S104), it displays an explanatory message at the reservation device.

If the DSS accepts the reservation, it adds the user id to a list of active users, updates a list of personal scan job types of all active users (if any) (S106), and downloads the updated list to the DAC of the scanner (S108). This may be implemented in much the same way as explained for a system administrator with reference to FIG. 7. In addition to the personal scan job types of the active users, the DSS may also keep a number of general scan job types in the list. After a user has been added to the list of active users, the DSS waits for a predetermined time interval (S110, S114) for a sign of scanning activity by the user at the scanner (S112, explained below).

After having made his reservation, the user selects "scan" and "workflow" at the operating console of the scanner 1, and finds his personal scan job types in the freshly downloaded list that the UI displays for selection on the display.

From this point on, scanning is performed in exactly the same way as described before, with reference to FIG. 3. The scan data file is transmitted to the image server 2, where the router service 55 takes care of it, e.g. by routing it to an application for further processing, or by sending it to the user's workstation 3. In any case, the router 55 sends a report to the DSS 51, stating the user id. Upon reception of the report from the router 55 (S112), the DSS 51 restarts the time-out for that user (S110).

Figure 7:
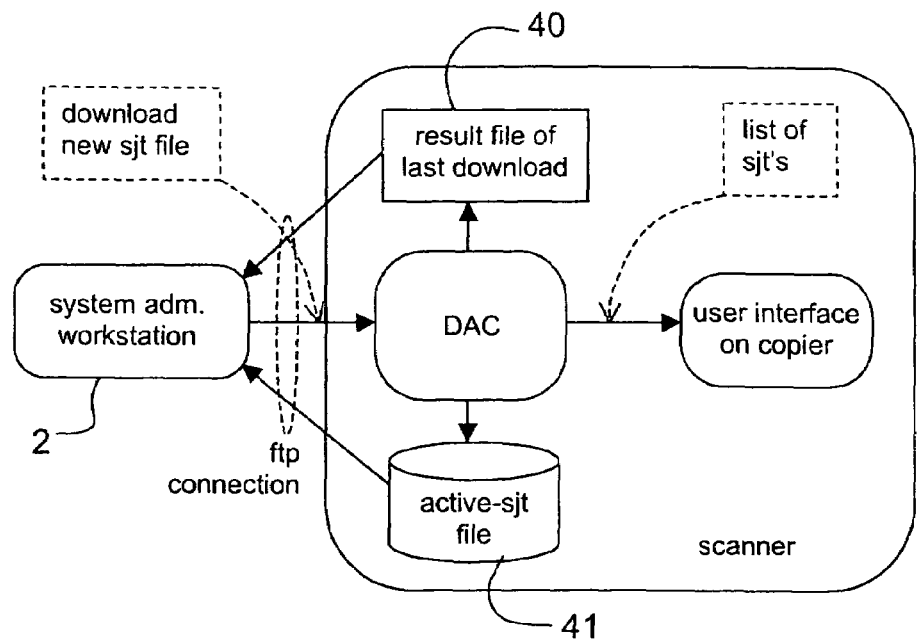
FIG. 7 shows a data exchange for installing a scan job type in the scanner according to the invention.

When the time-out for a user elapses (S114), the DSS deletes the user from its list of active users, updates the list of scan job types by deleting the personal scan job types of that user (S116) and downloads the updated list to the DAC of the scanner 1 (S118). It will be understood that the process of FIG. 7 is replicated for every single user upon his entering a reservation.

Personal scan job types may be installed in the personal-scan job type service by the users themselves, e.g. using the same mechanism as described for installing general scan job types in the first embodiment.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method for automating processing of scan data files generated by a digital image scanner, comprising:
   selecting, at the scanner, a specific scan job type from a list of pre-defined scan job types, each scan job type having pre-specified properties;
   scanning one or more documents according to properties of said specific scan job type, thereby generating a file of scan data;
   automatically synthesizing the scan data file including the scan data generated during the scanning step and meta data relating to the properties of said specific scan job type, said metadata also including data for selecting a certain further processing of the scan data in an image server and data for directing said selected further processing of the scan data in the image server;
   transmitting the scan data file to the image server;
   automatically analyzing, upon reception of the scan data file in the image server, the scan data file as to the data contained therein; and
   automatically further processing the scan data file in the image server in a way specified by said meta data contained therein.

2. The method according to claim 1, further comprising:
   pre-defining a scan job type, including specifying properties for said scan job type;
   transmitting a scan job type definition thus made to the scanner; and
   upon reception of a scan job type definition at the scanner, including said scan job type definition in the list of scan job types.

3. The method according to claim 2, further comprising:
   transmitting said scan job type definition to the image server and installing said scan job type therein, for reference when a scan data file is analyzed.

4. The method according to claim 1, wherein said meta data contained in the synthesized scan data file includes an application selector string which specifies said way of further processing of that scan data file.

5. The method according to claim 1, further comprising:
   automatically synthesizing a file name for the scan data file, said file name including at least part of said meta data.

6. The method according to claim 1, wherein said further processing includes displaying said scan data file on a display screen, storing said scan data file in a specified database, or submitting said scan data file to a printer for printing.

7. The method according to claim 1, wherein, in said scanning step, the scan data are generated according to specifications specified by the properties of the selected scan job type.

8. The method according to claim 1, wherein said properties of a scan job type include the requirement of a job number being given for a scan job, and wherein, before a scan job of said type is started, an operator is asked to enter a job number for that job, and said job number is automatically included in said meta data contained in the scan data file generated.

9. A method for use in a networked scanner device, in which documents are scanned thereby generating scan data and in which generated scan data are uploaded to a server via a network, said method comprising:
scanning a document to generate scan data; and
automatically generating a composite scan data file that includes the generated scan data and composite meta data comprising an application selector code which selects a certain further processing of the scan data in said server and comprising additional data for directing said selected further processing of the scan-data in said server, such that upon reception of the scan data file in the server, the scan data file is automatically analyzed as to the data contained therein, and the scan data file is automatically further processed in the server in a way specified by the meta data contained therein.

10. The method according to claim 9, also comprising:
automatically generating a file name for said scan data file, said file name including at least part of said composite meta data.

11. The method according to claim 9, further comprising:
storing generic composite meta data including an application selector code;
completing, by an operator, said generic composite meta data by entering additional identification data;
forming specific composite meta data based on said generic composite meta data and said additional identification data entered by the operator; and
scanning a document thereby generating a scan data file including said specific composite meta data.

12. The method according to claim 9, further comprising:
storing at least two different sequences of generic composite meta data, each relating to a respective scan job type and including a different application selector code;
presenting for selection said respective scan job types to an operator of the scanner device;
selection, by the operator, of one of said scan job types; and
scanning a document thereby generating a scan data file including a specific sequence of composite meta data based on the generic sequence of composite meta data of a scan job type selected by the operator.

13. The method according to claim 12, further comprising:
receiving identity information of an operator;
wherein, in the storing step, sets of at least one scan job type for each of a plurality of users are stored, and wherein, upon receiving said identity information of said operator, the set of scan job types of that operator is presented in the presenting step.

14. The method according to claim 12, wherein:
said identity information of an operator is inputted at the scanner device, and only said set of scan job types of that operator is presented.

15. The method according to claim 12, wherein:
said identity information of an operator is inputted at a remote site connected to the scanner, and said set of scan job types of that operator is presented at the scanner device for a predetermined time interval.

16. The method according to claim 13, further comprising:
defining, at a remote site, a scan job type having a sequence of generic composite meta data including an application selector code and possibly data fields to be completed by an operator; and
downloading said defined scan job type and the related sequence of generic composite meta data to the scanner device for use in said device.

17. An apparatus for use in a networked scanner device, in which documents are scanned thereby generating scan data and in which generated scan data are uploaded to a server via a network, said apparatus comprising:
a scan data generator to generate scan data for a document; and
a unit to automatically generate a composite scan data file including the generated scan data and meta data including an application selector code and additional directing data, together specifying a further processing of the scan data in said server, such that upon reception of the scan data file in the server, the scan data file is automatically analyzed as to the data contained therein, and the scan data file is automatically further processed in the server in a way specified by the meta data contained therein.

18. The apparatus according to claim 17, further comprising:
a unit to store generic composite meta data, including an application selector code;
a unit to enter, by the operator, additional identification data to complete said generic composite meta data;
a unit to form a specific composite scan data file based on said generic composite meta data and said additional identification data entered by the operator; and
a unit to scan a document thereby generating a scan data file including said specific composite meta data.

19. The apparatus according to claim 17, further comprising:
a unit to store at least two different sequences of generic composite meta data, each relating to a respective scan job type and including a different application selector code;
a unit to present for selection said respective scan job types to an operator of the scanner device;
a unit to select, by the operator, of one of said scan job types; and
a unit to scan a document thereby generating a scan data file including specific composite meta data based on the generic composite meta data of the scan job type selected by the operator.

20. The apparatus according to claim 19, further comprising:
a unit for receiving identity information of an operator, and wherein said unit to store generic composite meta data stores sets of at least one scan job type for each of a plurality of users, and wherein said unit to present scan job types for selection is connected to said unit for receiving identity information of an operator so as to present, upon receiving said identity information of an operator, the set of scan job types of that operator.

21. The apparatus according to claim 20, wherein said unit for receiving identity information of an operator is operable to input identity information of an operator at the scanner device, and aid unit to present scan job types for selection is operable to present the set of scan job types of that operator only.

22. The apparatus according to claim 20, wherein said unit for receiving identity information of an operator is connected to a remote site for inputting identity information of an operator, and said unit to present generic composite scan file names for selection is operable to present the set of scan job types of that operator at the scanner device for a predetermined time interval.

23. The apparatus according to claim 19, further comprising:
- a unit to define, at a remote site, a scan job type including a sequence of generic composite meta data including an application selector code and possibly data fields to be completed by an operator; and
- a unit to download said defined scan job type including said sequence of generic composite meta data to the scanner device for use in said device.

24. A data structure embodied on a computer-readable medium associated with a networked scanner device, in which documents are scanned thereby generating a scan file and in which a generated scan file is uploaded to a server via a network, said scan file including said data structure comprising:
- a scan data object to specify scan data pertaining to contents of one or more scanned documents of said scan file; and
- a meta data object, linked to the scan data object, to identify composite meta data at least including an application selector code which selects a certain further processing of the scan file in said server and additional data for directing said selected further processing of the scan file in said server, such that upon reception of the scan file in the server, the scan file is automatically analyzed as to the data contained therein, and the scan file is automatically further processed in the server in a way specified by the meta data contained therein.

25. The data structure according to claim 24, further comprising:
- an extra data object, linked to one of said scan data object and said meta data object, to specify additional identification data of the scan file.

26. A data structure embodied on a computer-readable medium associated with a networked scanner device, in which documents are scanned thereby generating a scan file and in which the generated scan file is uploaded to a server via a network, said scan file including said data structure comprising:
- a first section for accommodating scan data specifying contents of one or more scanned documents; and
- a second section, linked to said first section, for accommodating composite meta data at least including a predefined application selector code which selects a certain further processing of the scan file in said server and further including operator-completable additional identification data for directing said selected further processing of the scan file in said server, such that upon reception of the scan file in the server, the scan file is automatically analyzed as to the data contained therein, and the scan file is automatically further processed in the server in a way specified by the meta data contained therein.

27. An article of manufacture comprising a computer readable medium having embedded thereon a computer program to be processed by a computer that is connected, via a network, to a scanner device for scanning documents thereby generating a scan data file and for uploading the generated scan data file to a server via said network, said computer-readable-medium-embodied program comprising:
- a first segment to define generic composite meta data including an application selector code field and an additional data field for directing data, said fields together specifying a further processing of the generated scan data file to be performed in a server device connected to the network; and
- a second segment to upload said defined generic composite meta data to the scanner device for use in said device,
- wherein upon reception of the scan data file in the server device, the scan data file is automatically analyzed as to the data contained therein, and the scan data file is automatically further processed in the server device in a way specified by the meta data contained therein.

28. The article of manufacture according to claim 27, wherein said first segment is also operable to define said generic composite meta data so as to include at least one data field to be completed to enter said additional directing data by an operator at the scanner device.

29. The method according to claim 1, further comprising:
- before starting a scan job in the scanning step according to a selected scan job type to generate the scan data of the scan data file, asking an operator at a local scanner user interface to enter said data for directing said selected further processing of the scan data; and
- including said operator-entered data in the metadata of the scan data file.

30. The method according to claim 1, wherein the scan data includes text scan data pertaining to texts included in the one or more scanned documents.

31. The method according to claim 9, wherein the scan data include text scan data pertaining to texts included in the scanned document.

32. The apparatus according to claim 17, wherein the scan data include text scan data pertaining to texts included in the scanned document.

33. The data structure according to claim 24, wherein the scan data include text scan data pertaining to texts included in the one or more scanned documents.

34. The data structure according to claim 26, wherein the scan data include text scan data pertaining to texts included in the one or more scanned documents.

35. The article of manufacture according to claim 27, wherein the scan data file includes text scan data pertaining to texts included in the scanned documents.

* * * * *